United States Patent [19]

Yeo et al.

[11] Patent Number: 4,829,125

[45] Date of Patent: May 9, 1989

[54] METHOD OF PRODUCING AN OLEFIN THERMOPLASTIC RESIN COMPOSITION

[75] Inventors: Jong K. Yeo; Jong M. Oh; Suk K. Chang; Eon S. Lee, all of Chungcheongman, Rep. of Korea

[73] Assignee: Lucky Ltd., Seoul, Rep. of Korea

[21] Appl. No.: 197,335

[22] Filed: May 23, 1988

[30] Foreign Application Priority Data

May 26, 1987 [KR] Rep. of Korea .................. 87-5215

[51] Int. Cl.$^4$ .................. C08L 23/26; C08L 23/12; C08L 23/16
[52] U.S. Cl. .................. 525/194; 525/193; 525/197; 525/240; 524/528
[58] Field of Search .................. 525/194, 197, 240

[56] References Cited

U.S. PATENT DOCUMENTS

| | | | |
|---|---|---|---|
| Re. 31,518 | 2/1984 | Fischer | 525/197 |
| Re. 32,028 | 11/1985 | Fischer | 525/197 |
| 3,665,059 | 5/1972 | Mahlman | 525/197 |
| 3,669,722 | 6/1972 | Bishop | 525/902 |
| 4,212,787 | 7/1980 | Matsuda . | |
| 4,311,807 | 1/1982 | McCollough et al. | 525/197 |
| 4,375,531 | 3/1983 | Ross | 525/240 |
| 4,454,092 | 6/1984 | Shimizu et al. | 525/197 |
| 4,607,074 | 8/1986 | Hazelton et al. | 525/194 |
| 4,732,940 | 3/1988 | Yamaoka et al. | 525/240 |

FOREIGN PATENT DOCUMENTS 58-210949 12/1983 Japan .

*Primary Examiner*—Carman J. Seccuro
*Attorney, Agent, or Firm*—Michael N. Meller

[57] ABSTRACT

A given amount of crystalline polypropylene resin is blended with an olefin copolymer rubber to prepare a preblend comprising an olefin copolymer rubber/crystalline polypropylene and then the preblend is melt-blended with a crystalline polypropylene resin in the presence of peroxide. The present invention is based upon the fracture mechanism occurring between the crystalline polypropylene and rubber and is accomplished by the reciprocal combination of the reactions such as cross-linking reaction, random scission reaction of the polymer main chain, graft reaction and blocking reaction to form a cell structure. An object of the present invention is to provide a method which results in a product having better homogeneity, better heat-resistance, higher impact-resistance and greater flowabilty than heretofore known methods of preparation.

10 Claims, No Drawings

METHOD OF PRODUCING AN OLEFIN THERMOPLASTIC RESIN COMPOSITION

BACKGROUND OF THE INVENTION

The present invention relates to a method of producing an olefin thermoplastic resin composition of good impact-resistance and, particularly, to a method of producing a thermoplastic resin composition which comprises an olefin copolymer rubber forming a fixed phase structure and a crystalline polypropylene resin.

Because the crystalline olefin resin has a poor impact-resistance, a rubber component as an impact-modifier is mixed with it in order to overcome the above defect and to improve the impact-resistance. It has been known that a high impact property can be obtained by the method in which the rubber component is added to the crystalline polypropylene or a mixture of crystalline polypropylene and polyethylene particularly.

If a large quantity of olefin copolymer rubber component as the impact-modifier was melt-blended with the crystalline polypropylene, the impact-strength might be improved but the mechanical strength, elasticity, heat-resistance and flowability would be decreased, together with the additional disadvantages that the process properties, such as injection molding, would deteriorate. On the other hand, if a relatively small quantity of rubber component were blended so as to improve the mechanical strength, heat-resistance and fluidity, such defects as poor impact-strength, elongation and toughness, would be encountered.

In order to overcome the above problems, U.S. Pat. No. 4,212,787 discloses a method which comprises partially curing an olefin copolymer rubber under shear stress and then diluting it with an olefin resin of good fluidity.

The problems resulting from the equipment needed for the curing and diluting processes and the complexity of the process can be pointed out as defects.

The present inventors have known that if the phase structure of the crystalline polypropylene and the olefin copolymer rubber form a cellular structure, the flowability, which is important in injection molding, could be improved and then the low impact-strength and heat-resistance could be also improved.

The cell structure publicly known up to now can be made only in a crystalline polypropylene/polyethylene/ethylene-propylene copolymer rubber system and if these components are blended in the proper proportions, the cell structure can be achieved by their compatibility. But it has been known that a crystalline polypropylene/ethylene-propylene copolymer rubber system, except with a part of a crystalline ethylene-propylene copolymer resin, cannot form the cell structure according to the limited compatibility of these materials.

One known solution to this problem has been to use a cross-linking agent such as a peroxide and to blend on melting so as to form the cell structure of ethylene-propylene copolymer rubber together with a crystalline polypropylene resin. This procedure, however, raises another problem. The problems concerning physical properties like decreased elongation, toughness at a low temperature, etc., simultaneously occur in the process for improving the flowability through the dilution procedure of the previously cured elastomer component. Also, the restrictions according to the apparatus used during the dispersion process and the usage of crystalline polypropylene having good flowability are pointed out as problems.

SUMMARY OF THE INVENTION

One object of the present invention is to provide a method of producing a thermoplastic composition having improved flowability and good physical properties such as impact-resistance and heat-resistance pursuant to the cell structure and also forming a uniform microgel.

Another object of the present invention is to provide a method of producing a thermoplastic composition by a simple process.

DETAILED DESCRIPTION OF THE INVENTION

In the present method, a given amount of crystalline polypropylene resin is blended with an olefin copolymer rubber to prepare a preblend comprising an olefin copolymer rubber/crystalline polypropylene and then the preblend is melt-blended with a crystalline polypropylene resin in the presence of peroxide.

The crystalline polypropylene is dispersed inside the continuous rubber matrix of the preblend comprising an olefin copolymer rubber/crystalline polypropylene and then the crystalline polypropylene matrix in which a random degradation reaction of the main chain occurs, is blended. The resulting copolymer rubber is then combined with a free radical of the crystalline polypropylene resin and then a graft reaction and a block reaction occurs between the preblend itself or between the preblend and the crystalline polypropylene matrix. Therefore, the size of the resultant cell structure and dispersion phase can be controlled, and elongation, impact-strength at a low temperature, and toughness are effectively improved.

When the large cell particles, prepared while the previously cross-linked elastomer is diluted and blended with crystalline polypropylene resin, are considered in view of the improvement of impact strength, because of the shear yielding fracture mechanism of the crystalline propylene itself, it has been known that it is a more effective method of producing cell structure in which the size is controlled by a direct melt blending of the present invention (Toughened plastics; C. B. Bucknall, 1977).

The present invention can be accomplished by only a melt blending process in an olefin resin composition, instead of the method of production using phase inversion such as that of producing ABS (Acrylonitrile Butadiene Styrene Terpolymer) resin by an existing emulsion polymerization process and that of producing HIPS (High Impact Polystyrene) by a suspension polymerization/bulk polymerization.

In the present invention, the elastomer can be dispersed as a cell structure or simple dispersion form by means of direct melt blending concept and, additionally, the cell structure, by a cross-linking of the preblend, can be easily formed. The above are the main functions of the present method.

The present invention is based upon the fracture mechanism occurring between the crystalline polypropylene and rubber and is accomplished using the most logically reciprocal combination reactions which develop structure formation of suitable cell form and comprise cross-linking reaction raised when blending, the random scission reaction of the polymer main chain, graft reaction and blocking reaction.

In the present invention, to prepare the preblend of rubber matrix form, olefin copolymer rubber and crystalline polypropylene are homogeneously blended in a ratio of 1:0.01–0.5 to prepare the preblend in which crystalline polypropylene is dispersed into an olefin copolymer rubber. 10–75 parts by weight of the preblend and 90–25 parts by weight of crystalline polypropylene are homogeneously blended by a blending extruder in the presence of an organic peroxide.

The present invention concerns the method of producing an olefin thermoplastic resin composition, characterized, on the one hand, that the preblend is fixed as a cell form of interpenetrating polymer phase networks (IPN's) and, on the other hand, a matrix having a good compatibility with dispersed phase is formed.

The method of the present invention in which the cell structure of the preblend is fixed and the crystalline polypropylene added together with the preblend is grafted (hereinafter simultaneous production method), is achieved by the following concepts;

Cell formation having an IPN structure as the dispersion phase

Inducing block and graft reactions

Controlling optimum size of cell structure and dispersed elastomer particles

The method of the present invention uses such a concept that in the mixture of olefin copolymer rubber and crystalline polypropylene resin, because of a high ratio of olefin copolymer rubber, the olefin copolymer rubber forms interpenetrating polymer phase networks during the homogeneous blending procedure in the presence of a peroxide.

Also, the method of the present invention uses the concept that because the cell structure is not fixed by the common methods when the crosslinking agent is not added, the crosslinking agent must be added and homogeneously blended in order to fix the structure of the resin.

In place of improving the flowability by means of the existing dilution process, the object of flowability can be obtained simultaneously by inducing a graft reaction between the dispersed elastomeric phase and the crystalline polypropylene via controlling the random scission reaction of the main chain of the crystalline polypropylene which phenomenon occurs during melt-blending.

In the simultaneous production method, because the preblend comprising an olefin copolymer rubber/crystalline polypropylene is used as a raw material, when melt-blended together with a crystalline polypropylene resin in the presence of peroxide, the degree of homogeneity of the present invention is better than that of the case in which an only olefin copolymer rubber is used and then extremely good homogeneity can be obtained.

The inventors tried to eliminate the heterogeneous particles formed when crystalline polypropylene and an olefin copolymer rubber are blended and extruded in the presence of a peroxide, but they concluded that if a high shear rate did not apply, the elimination might be very difficult.

When the preblend of olefin copolymer rubber/crystalline polypropylene is blended with crystalline polypropylene pursuant to the present invention, even though the component for the purpose of partial curing, like the peroxide, is added, the homogeneity and impact-modification effects are excellent and a product having good flowability and a balance of several physical properties can be obtained.

When the mixture of olefin copolymer rubber and crystalline polypropylene is blended with polypropylene, the cross-linking reaction is caused by a peroxide. Therefore, even if a heterogeneous partially cured product is formed, it can be broken again homogeneously by the extrusion shear stress which is applied during the melt blending procedure.

Concerning the blending extruder of the present invention, the Banbary Kneader, Twin-screw extruder, Co-kneader, etc. are relatively good devices for blending effects. Because the physical properties are controlled by the selection of the device in the case of a continuous procedure, continuous kneading extrusion devices such as a Twin screw extruder, or a Co-kneader are preferable. But when preparing the preblend of olefin copolymer/crystalline polypropylene, which is not accompanied by any reactions, because the blending devices do not greatly influence the physical properties, there is no limit in the selection of the mixing device.

When an olefin copolymer rubber is melt blended in the presence of a peroxide without producing an olefin copolymer/crystalline polypropylene preblend like the present invention, if an ethylene-propylene copolymer compatible with an olefin copolymer rubber were used, a nonuniform cell structure would be partly formed and only when the shear stress required for blending was be very large, could a relatively uniform product be obtained (U.S. Pat. No. 4,454,092).

In another method in which crystalline polypropylene and an olefin copolymer rubber are completely blended to make a master-batch of the total ingredients and then it is melt-blended in the presence of a peroxide, when the content of crystalline polypropylene is relatively low, products having a low flowability may be prepared and when it is relatively high, the formation of a cell structure is not preferable according to excessive random scission reaction of the main chain of crystalline polypropylene by peroxide and the heat-resistance and impact-modification effect are low.

The above mechanism is considered to be the reason why the phase structure between crystalline polypropylene and an olefin copolymer rubber is changed by peroxide in the blending and cross-linking procedure between peroxide and crystalline polypropylene or an olefin copolymer rubber.

The present invention is effective when crystalline polypropylene is a chief component but in the case where an olefin copolymer rubber is a chief component, a cell structure is formed but an improved flowability effect does not appear. It can be assumed that when an olefin copolymer rubber is a chief component, interpenetrating polymer phase networks are mainly formed and on using the preblend of the present invention, cell structure can be formed (Polymer blends Vol. 2(1978); Paul and Newman, Chap. 20 by E. N. Kresge).

In the case where an olefin copolymer rubber is a chief component, the structure formation according to various preparation methods is nearly the same but in the case where crystalline polypropylene resin is the chief component, it is very versatile and can be applied to various purposes. By using an olefin copolymer rubber/crystalline polypropylene preblend of the present invention, all sorts of physical properties are balanced and homogeneity is effectively improved.

The crystalline polypropylene resin of the present invention is a thermoplastic polypropylene resin having a high molecular weight and can be a homopolymer or copolymer comprising an α-olefin monomer. Examples are a copolymer of ethylene, propylene, 1-butene, 1-pentene, 4-methyl-1-pentene, 1-hexene, etc. by the general preparation method of an olefin polymer, preferably isotactic or syndiotactic polypropylene, ethylene-propylene block or random copolymer.

Since the above crystalline polypropylene has a random scission phenomena in polymer main chain in view of its structure, the molecular weight of the crystalline polypropylene resin can have an effect on the physical properties of the final composition. Specifically, the flowability of the final products depends upon the selection of the M.W. of the crystalline polypropylene which is added directly, not preblended.

When a melt index of the usable crystalline polypropylene is determined at 230° C. and 2,160 g, that of the crystalline polypropylene which is used in preparing the preblend (hereinafter pp-1) is suitably about 0.5 to 30 and that of the crystalline polypropylene which is used in preparing the final composition together with the preblend is preferably about 0.5 to 5. If these ranges are exceeded, the flowability and uniformity of microgel elastomer which was partially cured among the products are unsatisfactory.

The olefin copolymer rubber of the present invention is nearly amorphous because the degree of crystallization is very low, and a random elastic copolymer in which monoolefins of more than two, comprising olefins such as ethylene-propylene-nonconjugated diene rubber, are copolymerized, wherein a "nonconjugated diene" stands for, for example, dicyclopentadiene, 1,4-hexadiene, cyclooctadiene, methylidene norbornene and ethylidene norbornene.

The olefin copolymer rubber can be cross-linked by a crosslinking agent like peroxide or sulphur and then lose its flowability to serve as fixing the phase structure, wherein the ratio of ethylene to propylene is more than 40:60, which represents the elastomeric properties.

Examples of the organic peroxides as cross-linking agents are dicumyl peroxide, di-tert-butyl peroxide, 1,3-bis (tert-butyl peroxy isopropyl) benzene, 2,5-dimethyl-2,5-di(tert-butyl peroxy) hexane, benzoyl peroxide, p-chlorobenzoly peroxide or 2,4-dichlorobenzoyl peroxide and a powdered peroxide mixture which may be dispersed in a mineral filler prepared safely with respect to handling is effectively applied.

The amount of organic peroxide can be controlled according to the degree of cross-linking of the copolymer rubber and it is most effective to use 0.05-2 parts by weight.

In order to control the flowability of the final product, the amount of the organic peroxide and the molecular weight of the pp-2 resin giving an improved effect of flowability should be considered and with a suitable combination, the purpose may be accomplished.

The olefin copolymer rubber and crystalline polypropylene are melt blended so that olefin copolymer rubber component in the preblend is comprised as much content and is prepared in pellet form. When the pellet is homogeneously blended with the crystalline polypropylene resin in the presence of peroxide, partial cross-linkage occurs, and the phase structure of the elastomer capable of absorbing the impact is fixed to enlarge the apparent volume of elastomer, which is one of the main purposes. The components are melt blended so that the amount of pp-1 to total 100 parts by weight of olefin copolymer rubber is 1-50 parts by weight and then the crystalline polypropylene (pp-1) is dispersed into an olefin copolymer rubber matrix.

The above preblend and pp-2 are melt blended with organic peroxide at 170°-280° C. in an extrusion device to obtain the desired physical properties and uniformity, and it is preferable to control the temperature so that the reaction is completely carried out at 200°-250° C. considering the residence time.

In order to improve the efficiency of cross-linking and to obtain heat-stability, an unsaturated monomer may be used together with the peroxide, wherein selection of the ones which prevent excessive scission of the polymer main chain of the crystalline polypropylene when homogeneously blended with the crystalline polypropylene and olefin copolymer rubber and retain the stability of the radical prepared so that the improvement of the binding capacity of the cell and a continuous phase can be induced in order to form the IPN's structure is recommended.

Examples are trimethylol propane trimethacrylate, diallyl phthalate, ethylene dimethacrylate, triallyl isocyanurate, triallyl cyanurate or m-phenylene bismaleimide and triallyl cyanurate and triallyl isocyanurate are most preferable in the efficiency and radical stability aspects. The effective amount is about 0.05-2 parts by weight and they can be used by dissolving it in a hydrocarbon solvent or as a powder phase dispersed in a mineral filler such as peroxide.

Because the unsaturated monomer is mainly activated by peroxide, it must be well dispersed and it is effective to use a compatible liquid comprising a functional group, such as a plasticizer or coupling agent.

As a plasticizer for the purpose of dispersion, DOP (Dioctyl phthalate) of the phthalate type and process oil are suitable and as a binding agent, β-(3,4-epoxy cyclohexyl)ethyl trimethoxy silane, γ-glycidoxy propyl trimethoxy silane or γ-methacryloxy propyl trimethoxy silane of silane type are effective for the purpose of eliminating moisture and dispersing.

They are used as a solvent being 0.1-5 times as much as the cross-linking agent and cross-linking coagent. Because it affects the stiffness of the products when they are excessively blended out of the above range, it can be used less than 5% for the effective dispersion of the crosslinking agents.

Also a common additive agent such as an anti-oxidant, UV-stabilizer, heat-stabilizer, coloring substance, mineral filler or crystallization promoting agent mainly used in the general polymer processing industry can be used in the range that they do not largely influence the heat-decomposition phenomenon of the peroxide and especially the stabilizer, plasticizer or process oil used in rubber processing industry can be used with a suitable combination according to its purpose.

An object of the present invention is to provide a method which results in a product having better homogeneity, better heat-resistance, higher impact-resistance and greater flowability than heretofore known methods of preparation.

This can be found in the tables below, where the products from the process of the present invention are compared with products of known processes(the reference examples).

These unobvious advantages are believed to be as a result of the formation of a preblend of, for example, EPDM and PP which may be in pelletized form, to which is then added a proper amount of PP and treated with a peroxide, in accordance with the present invention.

The present invention will be further described in detail with the examples given below. It should be noted that the invention is not limited to these examples.

In the examples, evaluation of physical properties were made according to the testing method of ASTM in the injection molding device having a barrel temperature of 200°–230° C. and a mold temperature of 30°–50° C.

The melt indices of pp-1 and pp-2 used in the present examples and references are 2.5 g/10 min at 230° C. and 2,160 g. EPDM is a terpolymer of ethylene propylene ethylidene norbornene in which the ratio of ethylene to propylene is 65:35, ML1+8 (127° C.) of it is 55 and iodine value is 10.

EXAMPLE 1

85 parts by weight of EPDM were mixed with 15 parts by weight of pp-1 (a crystalline ethylene-propylene copolymer) for 10 minutes in a Banbary Kneader pre-heated to 180° C. to be formed into pellets. 100 parts by weight of the EPDM/pp-1 pellets and 150 parts by weight of pp-2(the same crystalline ethylene-propylene copolymer as pp-1) were prepared, and the mixture of 1.25 parts by weight of a mixed powder (Perkadox 14-40) containing 40% 1,3-bis(tert-butyl peroxy isopropyl) benzene and 60% $CaCO_3$, 1 part by weight of a mixed powder(Perkalink 301-50) containing 50% triallyl isocyanurate and 50% silica and 2.5 parts by weight of DOP were mixed together for 5 minutes in a 3-roll mill in order to be homogeneously dispersed. Then the milled solution was further mixed with the preblended EPDM/pp-1 and pp-2 pellets homogeneously for 2 minutes in a Henshell mixer.

The mixture obtained was melt blended in a Co-kneader (Buss MDK/E-46) whose barrel temperature was adjusted to 200°–240° C., and was extruded to prepare the products.

The resultant product was injection molded and the physical properties were determined.

The result is shown in Table 1 below.

Particularly, this process was carried out under a nitrogen atmosphere to avoid contact with oxygen, and the latter part of the melt blending process, in the step of extrusion, after kneading step, was maintained under vacuum to remove unreacted monomer and gas.

EXAMPLE 2

After obtaining the products by following the procedure of Example 1 but using a crystalline propylene homopolymer for pp-1 when preparing EPDM/pp-1 pellets and using the same crystalline propylene homopolymer for pp-2 as for pp-1. The product was injection molded and the physical properties were determined.

The result is shown in Table 1 below.

EXAMPLE 3

After obtaining the products by following the procedure of Example 1 but using a crystalline propylene homopolymer for pp-2, the product was injection molded and the physical properties were determined.

The result is shown in Table 1 below.

EXAMPLE 4

74 parts by weight of EPDM were mixed with 26 parts by weight of pp-1 (a crystalline ethylene-propylene copolymer) for 10 minutes in a Bunbury Kneader pre-heated to 180° C. to be formed into pellets. 100 parts by weight of the EPDM/pp-1 pellets and a 117.2 parts by weight of pp-2 (the same crystalline ethylene-propylene copolymer as pp-1) were prepared, and the mixture of 1.1 parts by weight of mixed powder (Perkadox 14-40) containing 40% 1,3-bis(tert-butyl peroxy isopropyl) benzene and 60% $CaCO_3$, 0.87 parts by weight of mixed powder(Perkalink 301-50) containing 50% triallyl isocyanurate and 50% silica and 2.2 parts by weight of DOP were mixed together for 5 minutes in a 3-roll mill in order to be homogeneously dispersed. Then the milled solution was further mixed with the preblended EPDM/pp-1 and pp-2 pellets homogeneously for 2 minutes in a Henshell mixer.

The mixture obtained was melt blended in a Co-kneader (Buss MDK/E-46) whose barrel temperature was adjusted to 200°–240° C., and was extruded to prepare the products.

The resultant product was injection molded and the physical properties were determined.

The result is shown in Table 1 below.

Particularly, this process was carried out under nitrogen atmosphere to avoid contact with oxygen, and the latter part of the melt blending process, in the step of extrusion, after kneading step, was maintained under vacuum to remove unreacted monomer and gas.

EXAMPLE 5

After obtaining the products by following the procedure of Example 4 but using a crystalline propylene homopolymer for pp-1 when preparing EPDM/pp-1 pellets, and using the same crystalline propylene homopolymer for pp-2 as for pp-1. The product was injection molded and the physical properties were determined.

The result is shown in Table 1 below.

EXAMPLE 6

After obtaining the products by following the procedure of Example 4 but using a crystalline propylene homopolymer for pp-2, the product was injection molded and the physical properties were determined.

The result is shown in Table 1 below.

EXAMPLE 7

85 parts by weight of EPDM were mixed with 15 parts by weight of pp-1 (a crystalline ethylene-propylene copolymer) for 10 minutes in a Bunbury Kneader pre-heated to 180° C. to be formed into pellets. 100 parts by weight of the EPDM/pp-1 pellets and the 231 parts by weight of pp-2 (the same crystalline ethylene-propylene copolymer as pp-1) were prepared, and the mixture of 1.65 parts by weight of a mixed powder (Perkadox 14-40) containing 40% 1,3-bis(tert-butyl peroxy isopropyl) benzene and 60% $CaCO_3$, 1.32 parts by weight of a mixed powder(Perkalink 301-50) containing 50% triallyl isocyanurate and 50% silica and 3.3 parts by weight of DOP were mixed together for 5 minutes in a 3-roll mill in order to be homogeneously dispersed. Then the milled solution was further mixed with the preblended EPDM/pp-1 and pp-2 pellets homogeneously for 2 minutes in a Henshell mixer.

The resultant mixture was melt-blended in a Co-kneader (Buss MDK/E-46) whose barrel temperature was adjusted to 200°–240° C., and was extruded to prepare the products.

The resultant product was injection molded and the physical properties were determined.

The result is shown in Table 1 below.

Particularly, this process was carried out under nitrogen atmosphere to avoid contact with oxygen, and the latter part of the melt blending process, in the step of extrusion after kneading step, was maintained under vacuum to remove unreacted monomer and gas.

EXAMPLE 8

After obtaining the products by following the procedure of Example 7 but using a crystalline propylene homopolymer for pp-1 when preparing EPDM/pp-1 pellets and using the same crystalline propylene homopolymer for pp-2 as for pp-1. The product was injection molded and the physical properties were determined.

The result is shown in Table 1 below.

xEXAMPLE 9

After obtaining the products by following the procedure of Example 7 but using a crystalline propylene homopolymer for pp-2, the product was injection molded and the physical properties were determined.

The result is shown in Table 1 below.

EXAMPLE 10

74 parts by weight of EPDM were mixed with 26 parts by weight of pp-1 (a crystalline ethylene-propylene copolymer) for 10 minutes in a Bunbury Kneader pre-heated to 180° C. to be formed into pellets. 100 parts by weight of the EPDM/pp-1 pellets and 190 parts by weight of pp-2 (the same crystalline ethylene-propylene copolymer as pp-1) were prepared, and the mixture of 1.45 parts by weight of mixed powder (Perkadox 14-40) containing 40% 1,3-bis(tert-butyl peroxy isopropyl) benzene and 60% $CaCO_3$, 1.16 parts by weight of mixed powder (Perkalink 301-50) containing 50% triallyl isocyanurate and 50% silica and 2.9 parts by weight of DOP were mixed together for 5 minutes in a 3-roll mill in order to be homogeneously dispersed. Then the milled solution was further mixed with the problended EPDM/pp-1 and pp-2 pellets homogeneously for 2 minutes in a Henshell mixer.

The resultant mixture was melt blended in a Co-kneader (Buss MDK/E-46) whose barrel temperature was adjusted to 200°-240° C., and was extruded to prepare the products.

The resultant product was injection molded and the physical properties were determined.

The result is shown in Table 1 below.

Particularly, this process was carried out under nitrogen atmosphere to avoid contact with oxygen, and the latter part of the melt blending process, in the step of extrusion after kneading step, was maintained under vacuum to remove unreacted monomer and gas.

EXAMPLE 11

After obtaining the products by following the procedure of Example 10 but using a crystalline propylene homopolymer for pp-1 when preparing EPDM/pp-1 pellets and using the same crystalline propylene homopolymer for pp-2 as for pp-1. The products were injection molded and the physical properties were determined.

The result is shown in Table 1 below.

EXAMPLE 12

After obtaining the products by following the procedure of Example 10 but using a crystalline propylene homopolymer for pp-2, the product was injection molded and the physical properties were determined.

The result is shown in Table 1 below.

TABLE 1

| | | Example 1 | Example 2 | Example 3 | Example 4 | Example 5 | Example 6 |
|---|---|---|---|---|---|---|---|
| Preblend | EPDM | 85 | 85 | 85 | 74 | 74 | 74 |
| (Bunbury Kneader) | pp-1(CO) | 15 | — | 15 | 26 | — | 26 |
| | (HOMO) | — | 15 | — | — | 26 | — |
| Step producing | Preblend | 100 | 100 | 100 | 100 | 100 | 100 |
| simultaneous | EPDM | — | — | — | — | — | — |
| structure | pp-2(CO) | 150 | — | — | 117.2 | — | — |
| (Co-kneader) | (HOMO) | — | 150 | 150 | — | 117.2 | 117.2 |
| | Organic peroxide (Perkadox 14-40 | 1.25 | 1.25 | 1.25 | 1.1 | 1.1 | 1.1 |
| | Cross-linking coagent (Perkalink 301-50) | 1 | 1 | 1 | 0.87 | 0.87 | 0.87 |
| | DOP | 2.5 | 2.5 | 2.5 | 2.2 | 2.2 | 2.2 |
| Melt index | g/10 min | 6.3 | 12.0 | 11.2 | 4.2 | 5.8 | 5.5 |
| Elongation at break* | % | 695 | 780 | 772 | >800 | >800 | >800 |
| Impact-strength (Izod Notched) (⅛") | (−20° C.) Kg. cm/cm | 32.1 | 26.0 | 28.5 | 48.8 | 30.2 | 31.5 |
| Vicat softening temperature | °C. | 115 | 125 | 120 | 117 | 120 | 119 |

| | | Example 7 | Example 8 | Example 9 | Example 10 | Example 11 | Example 12 |
|---|---|---|---|---|---|---|---|
| Preblend | EPDM | 85 | 85 | 85 | 74 | 74 | 74 |
| (Bunbury Kneader) | pp-1(CO) | 15 | — | 15 | 26 | — | 26 |
| | (HOMO) | — | 15 | — | — | 26 | — |
| Step producing | Preblend | 100 | 100 | 100 | 100 | 100 | 100 |
| simultaneous | EPDM | — | — | — | — | — | — |
| structure | pp-2(CO) | 231 | — | — | 190 | — | — |
| (Co-kneader) | (HOMO) | — | 231 | 231 | — | 190 | 190 |
| | Organic peroxide (Perkadox 14-40 | 1.65 | 1.65 | 1.65 | 1.45 | 1.45 | 1.45 |
| | Cross-linking coagent | 1.32 | 1.32 | 1.32 | 1.16 | 1.16 | 1.16 |

TABLE 1-continued

|  |  |  |  |  |  |  |  |
|---|---|---|---|---|---|---|---|
|  | (Perkalink 301-50) |  |  |  |  |  |  |
|  | DOP |  | 3.3 | 3.3 | 3.3 | 2.9 | 2.9 | 2.9 |
| Melt index | g/10 min | 9.9 | 15.3 | 13.0 | 7.0 | 11.0 | 10.9 |
| Elongation at break* | % | 580 | 620 | 620 | 470 | 490 | 490 |
| Impact-strength (Izod Notched) (⅛") | (−20° C.) Kg. cm/cm | 18.2 | 10.5 | 16.0 | 22.5 | 14.5 | 20.6 |
| Vicat softening temperature | °C. | 135 | 137 | 135 | 135 | 138 | 135 |

*measuring at 200 mm/min

REFERENCE 1

To investigate the function of the preblend, the following was carried out;

34 parts by weight of EPDM in a pellet form and 66 parts by weight of pp-2 (a crystalline ethylene-propylene copolymer) were prepared, and the mixture of 0.5 parts by weight of mixed powder(Perkadox 14-40) containing 40% 1,3-bis(tert-butyl peroxy isopropyl)benzene and 60% CaCO₃, 0.4 parts by weight of mixed powder(Perkalink 301-50) containing 50% triallyl isocyanurate and 50% silica and 1.0 part by weight of DOP were mixed together for 5 minutes in a 3-roll mill in order to be homogeneously dispersed. Then the milled solution was further mixed with the EPDM and pp-2 pellets homogeneously for 2 minutes in a Henshell mixer.

The mixture obtained was melt blended in a Co-kneader (Buss MDK/E-46) whose barrel temperature was adjusted to 200°–240° C., and was extruded to prepare the products.

The resultant product was injection molded and the physical properties were determined.

The result is shown in Table 2 below.

Particularly, this process was carried out under nitrogen atmosphere to avoid contact with oxygen, and the latter part of the melt blending process, in the step of extrusion after kneading step was maintained under vacuum to remove unreacted monomer and gas.

REFERENCE 2

After obtaining the products by following the procedure of Reference 1 but using a crystalline propylene homopolymer instead of a crystalline ethylene-propylene copolymer, the product was injection molded and the physical properties were determined.

The result is shown in Table 2 below.

REFERENCE 3

After obtaining the products by following the procedure of Reference 1 but using a mixture containing 60 parts by weight of a crystalline propylene homopolymer and 6 parts by weight of a crystalline ethylene-propylene copolymer instead of 66 parts by weight of a crystalline ethylene propylene copolymer, the product was injection molded and the physical properties were determined.

The result is shown in Table 2 below.

REFERENCE 4

34 parts by weight of EPDM were mixed with 66 parts by weight of pp-1 (a crystalline ethylene-propylene copolymer) in a Bunbury Kneader pre-heated to 180° C. to form pellets. And the mixture of 0.5 parts by weight of a mixed powder (Perkadox 14-40) containing 40% 1,3-bis(tert-butyl peroxy isopropyl) benzene and 60% CaCO₃, 0.4 part by weight of a mixed powder (Perkalink 301-50) containing 50% triallyl isocyanurate and 50% silica and 1.0 part by weight of DOP were mixed together for 5 minutes in a 3-roll mill in order to be homogeneously dispersed. Then the milled solution was further mixed with the preblended pellets homogeneously for 2 minutes in a Henshell mixer.

The mixture obtained was melt blended in a Co-kneader (Buss MDK/E-46) whose barrel temperature was adjusted to 200°–240° C., and was extruded to prepare the products.

The resultant product was injection molded and the physical properties were determined.

The result is shown in Table 2 below.

Particularly, this process was carried out under nitrogen atmosphere to avoid contact with oxygen, and the latter part of the melt blending process, in the step of extrusion after kneading step, was maintained under vacuum to remove unreacted monomer and gas.

REFERENCE 5

After obtaining the products by following the procedure of Reference 4 but using a crystalline propylene homopolymer instead of a crystalline ethylene-propylene copolymer, the product was injection molded and the physical properties were determined.

The result is shown in Table 2 below.

REFERENCE 6

After obtaining the products by following the procedure of Reference 4 but using a mixture containing 60 parts by weight of a crystalline propylene homopolymer and 6 parts by weight of a crystalline ethylene-propylene copolymer instead of 66 parts by weight of a crystalline ethylene-propylene copolymer, the product was injection molded and the physical properties were determine.

The result is shown in Table 2 below.

REFERENCE 7

To investigate the function of the preblend, the following was carried out;

25.5 parts by weight of EPDM in a pellet form and 74.5 parts by weight of pp-2 (a crystalline ethylene-propylene copolymer) were prepared, and the mixture of 0.5 parts by weight of a mixed powder(Perkadox 14-40) containing 40% 1,3-bis(tert-butyl peroxy isopropyl)benzene and 60% CaCO₃, 0.4 parts by weight of a mixed powder(Perkalink 301-50) containing 50% triallyl isocyanurate and 50% silica and 1.0 part by weight of DOP were mixed together for 5 minutes in a 3-roll mill in order to be homogeneously dispersed. Then the milled solution was further mixed with the EPDM and pp-2 pellets homogeneously for 2 minutes in a Henshell mixer.

The mixture was melt blended in a Co-kneader (Buss MDK/E-46) whose barrel temperature was adjusted to 200°-240° C., and was extruded to prepare the products.

The resultant product was injection molded and the physical properties were determined.

The result is shown in Table 2 below.

Particularly, this process was carried out under nitrogen atmosphere to avoid contact with oxygen, and the latter part of the melt blending process, in the step of extrusion after kneading step, was maintained under vacuum to remove unreacted monomer and gas.

REFERENCE 8

After obtaining the products by following the procedure of Reference 7 but using a crystalline propylene homopolymer instead of a crystalline ethylene-propylene copolymer, the product was injection molded and the physical properties were determined.

The result is shown in Table 2 below.

REFERENCE 9

After obtaining the products by following the procedure of Reference 7 but using a mixture containing 70 parts by weight of a crystalline propylene homopolymer and 4.5 parts by weight of a crystalline ethylene-propylene copolymer instead of 74.5 parts by weight of a crystalline ethylene-propylene copolymer, the product was injection molded and the physical properties were determined.

The result is shown in Table 2 below.

REFERENCE 10

25.5 parts by weight of EPDM were mixed with 74.5 parts by weight of pp-1 (a crystalline ethylene-propylene copolymer) in a Bunbury Kneader pre-heated to 180° C. to form pellets. And the mixture of 0.5 parts by weight of a mixed powder (Perkadox 14-40) containing 40% 1,3-bis(tert-butyl peroxy isopropyl) benzene and 60% $CaCO_3$, 0.4 parts by weight of a mixed powder (Perkalink 301-50) containing 50% triallyl isocyanurate and 50% silica and 1.0 parts by weight of DOP were mixed together for 5 minutes in a 3-roll mill in order to be homogeneously dispersed, and then the milled solution was further mixed with the preblended pellets homogeneously for 2 minutes in a Henshell mixer.

The resultant mixture was melt blended in a Co-kneader (Buss MDK/E-46) whose barrel temperature was adjusted to 200°-240° C., and was extruded to prepare the products.

The resultant product was injection molded and the physical properties were determined.

The result is shown in Table 2 below.

Particularly, this process was carried out under nitrogen atmosphere to avoid contact with oxygen, and the latter part of the melt blending process, in the step of extrusion after kneading step, was maintained under vacuum to remove unreacted monomer and gas.

REFERENCE 11

After obtaining the products by following the procedure of Reference 10 but using a crystalline propylene homopolymer instead of a crystalline ethylene-propylene copolymer, the product was injection molded and the physical properties were determined.

The result is shown in Table 2 below.

REFERENCE 12

After obtaining the product by following the procedure of Reference 10 but using a mixture containing 70 parts by weight of a crystalline propylene homopolymer and 4.5 parts by weight of a crystalline ethylene-propylene copolymer instead of 74.5 parts by weight of a crystalline ethylene-propylene copolymer, the product was injection molded and the physical properties were determined.

The result is shown in Table 2 below.

TABLE 2

| | | Reference 1 | Reference 2 | Reference 3 | Reference 4 | Reference 5 | Reference 6 |
|---|---|---|---|---|---|---|---|
| Preblend | EPDM | — | — | — | 34 | 34 | 34 |
| (Bunbury Kneader) | pp-1(CO) | — | — | — | 66 | — | 6 |
| | (HOMO) | — | — | — | — | 66 | 60 |
| Step producing | Preblend | — | — | — | 100 | 100 | 100 |
| simultaneous | EPDM | 34 | 34 | 34 | — | — | — |
| structure | pp-2(CO) | 66 | — | 6 | — | — | — |
| (Co-kneader) | (HOMO) | — | 66 | 60 | — | — | — |
| | Organic peroxide (Perkadox 14-40) | 0.5 | 0.5 | 0.5 | 0.5 | 0.5 | 0.5 |
| | Cross-linking coagent (Perkalink 301-50) | 0.4 | 0.4 | 0.4 | 0.4 | 0.4 | 0.4 |
| | DOP | 1.0 | 1.0 | 1.0 | 1.0 | 1.0 | 1.0 |
| Melt index | g/10 min | 15.9 | 19.8 | 16.6 | 8.5 | 11.7 | 9.0 |
| Elongation at break* | % | 220 | 360 | 240 | 410 | 380 | 380 |
| Impact-strength (Izod Notched) (⅛") | (−20° C.) Kg. cm/cm | 8.2 | 6.7 | 6.5 | 19.1 | 18.8 | 19.0 |
| Vicat softening temperature | °C. | 115 | 120 | 117 | 112 | 120 | 116 |

| | | Reference 7 | Reference 8 | Reference 9 | Reference 10 | Reference 11 | Reference 12 |
|---|---|---|---|---|---|---|---|
| Preblend | EPDM | — | — | — | 25.5 | 25.5 | 25.5 |
| (Bunbury Kneader) | pp-1(CO) | — | — | — | 74. | — | 4.5 |
| | (HOMO) | — | — | — | — | 74.5 | 70 |
| Step producing | Preblend | — | — | — | 100 | 100 | 100 |
| simultaneous | EPDM | 25.5 | 25.5 | 25.5 | — | — | — |
| structure | pp-2(CO) | 74.5 | — | 4.5 | — | — | — |
| (Co-kneader) | (HOMO) | — | 74.5 | 70 | — | — | — |

TABLE 2-continued

|  |  |  |  |  |  |  |  |
|---|---|---|---|---|---|---|---|
|  | Organic peroxide (Perkadox 14-40) | 0.5 | 0.5 | 0.5 | 0.5 | 0.5 | 0.5 |
|  | Cross-linking coagent (Perkalink 301-50) | 0.4 | 0.4 | 0.4 | 0.4 | 0.4 | 0.4 |
|  | DOP | 1.0 | 1.0 | 1.0 | 1.0 | 1.0 | 1.0 |
| Melt index | g/10 min | 22.3 | 25.1 | 25.0 | 16.0 | 16.3 | 16.2 |
| Elongation | % | 180 | 210 | 210 | 290 | 310 | 320 |
| Impact-strength (Izod Notched) (⅛") | (−20° C.) Kg. cm/cm | 5.3 | 4.2 | 4.7 | 8.6 | 6.7 | 9.0 |
| Vicat softening temperature | °C. | 132 | 130 | 133 | 130 | 132 | 132 |

*measuring at 200 mm/min

REFERENCE 13

85 parts by weight of EPDM and 15 parts by weight of pp-1 (a crystalline ethylene-propylene copolymer) were prepared, and the mixture of 1.25 parts by weight of a mixed powder (Perkadox 14-40) containing 40% 1,3-bis (tert-butyl peroxy isopropyl) benzene and 30% $CaCO_3$, 1.00 part by weight of a mixed powder (Perkalink 301-50) containing 50% triallyl isocyanurate and 50% silica and 2.5 parts by weight of DOP were mixed together for 5 minutes in a 3-roll mill in order to be homogeneously dispersed, and then the mixed solution was with the EPDM and pp-1 pellets homogeneously for 2 minutes in a Henshell mixer.

The mixer was melt blended for 10 minutes in a Bunbury Kneader pre-heated to 180° C. to form pellets, and then 100 parts by weight of the pellets obtained and 150 parts by weight of pp-2 (the same crystalline ethylene-propylene copolymer as pp-1) were dried and mixed.

The resultant mixture was melt blended in a Co-kneader (Buss MDK/E-46) whose barrel temperature was adjusted to 200°-240° C., and was extruded to prepare the products.

The resultant product was injection molded and the physical properties were determined.

The result is shown in Table 3 below.

Particularly, this process was carried out under nitrogen atmosphere to avoid contact with oxygen, and the latter part of the melt blending process, in the step of extrusion after kneading step, was maintained under vacuum to remove unreacted monomer and gas.

REFERENCE 14

74 parts by weight of EPDM and 26 parts by weight of pp-1 (a crystalline ethylene-propylene copolymer) were prepared and the mixture of 1.25 parts by weight of a mixed powder (Perkadox 14-40) containing 40% 1,3-bis(tert-butyl peroxy isopropyl) benzene and 30% $CaCO_3$, 1.00 part by weight of mixed powder (Perkalink 301-50) and 2.5 parts by weight of DOP were mixed together for 5 minutes in a 3-roll mill in order to be homogeneously dispersed, and then the milled solution was further mixed with the EPDM and pp-1 pellets homogeneously for 2 minutes in a Henshell mixer.

The mixture was melt blended for 10 minutes in a Bunbury Kneader pre-heated to 180° C. to form pellets, and then 100 parts by weight of the pellets obtained and 117.2 parts by weight of pp-2(the same crystalline ethylene-propylene copolymer as pp-1) were dried and mixed.

The resultant mixture was homogeneously blended in a Co-kneader (Buss MDK/E-46) whose barrel temperature was adjusted to 200°-240° C., and was extruded to prepare the products.

The product obtained was injection molded and the physical properties were determined.

The result is shown in Table 3 below.

Particularly, this process was carried out under nitrogen atmosphere to avoid contact with oxygen, and the latter part of the steps of extrusion, was maintained under vacuum to remove unreacted monomer and gas.

REFERENCE 15

After obtaining the products by following the procedure of Reference 13 but using a crystalline propylene homopolymer for pp-2, the product was injection molded and the physical properties were determined.

The result is shown in Table 3 below.

REFERENCE 16

After obtaining the products by following the procedure of Reference 14 but using 117.2 parts by weight of a crystalline propylene homopolymer for pp-2, the product was injection molded and the physical properties were determined.

The result is shown in Table 3 below.

TABLE 3

|  |  | Reference 13 | Reference 14 | Reference 15 | Reference 16 |
|---|---|---|---|---|---|
| Preblend (Bunbury Kneader) | EPDM | 85 | 74 | 85 | 74 |
|  | pp-1(CO) | 15 | 26 | 15 | 26 |
|  | (HOMO) | — | — | — | — |
|  | Organic peroxide (Perkadox 14-40) | 1.25 | 1.25 | 2.5 | 1.25 |
|  | Cross-linking coagent (Perkalink 301-50) | 1 | 1 | 1 | 1 |
|  | DOP | 2.5 | 2.5 | 2.5 | 2.5 |

TABLE 3-continued

|  |  | Reference 13 | Reference 14 | Reference 15 | Reference 16 |
|---|---|---|---|---|---|
| Dilution step | Preblend | 100 | 100 | 100 | 100 |
| (Co-kneader) | pp-2(CO) | 150 | 117.2 | — | — |
|  | (HOMO) | — | — | 150 | 117.2 |
| Melt index | g/10 min | 0.6 | 1.0 | 0.9 | 1.2 |
| Elongation at break* | % | 498 | 532 | 340 | 467 |
| Impact-strength |  |  |  |  |  |
| (Izod Notched) | (−20° C.) | 25.1 | 14.5 | 11.3 | 10.0 |
| (⅛") | Kg. cm/cm | 116 | 115 | 119 | 118 |
| Vicat softening temperature | °C. |  |  |  |  |

*measuring 200 mm/min

We claim:

1. A method of producing an olefin thermoplastic resin composition, which comprises blending an olefin copolymer rubber and a crystalline polypropylene in the ratio of 1:0.01–0.5 to prepare a preblend in which the crystalline polypropylene is dispersed into the olefin copolymer rubber and then melt blending 10–75 parts by weight of said preblend and 90–25 parts by weight of the crystalline polypropylene in the presence of an organic peroxide in a blending extruder.

2. A method according to claim 1, wherein said olefin copolymer rubber is an ethylene-propylene copolymer rubber or ethylene-propylene-non-conjugated diene rubber.

3. A method according to claim 2, wherein said non-conjugated diene is dicyclopentadiene, 1,4-hexadiene, cyclooctadiene, methylidene norbornene or ethylidene norbornene.

4. A method according to claim 1, wherein said crystalline polypropylene is a homopolymer or copolymer with an α-olefin monomer.

5. A method according to claim 4, wherein said α-olefin monomer is ethylene, 1-butene, 1-pentene, 4-methyl-1-pentene or 1-hexene.

6. A method according to claim 1, wherein said crystalline polypropylene is isotactic polypropylene or an ethylene-propylene random copolymer.

7. A method according to claim 1, wherein said organic peroxide is dicumyl peroxide, di-tert-butyl peroxide, 1,3-bis(tert-butyl peroxy isopropyl) benzene, 2,5-dimethyl-2,5-di(tert-butyl peroxide) hexane, benzoyl peroxide, p-chlorobenzoyl peroxide or 2,4-dichlorobenzoyl peroxide.

8. A method according to claim 1, wherein said preblend is a pellet form.

9. A method according to claim 1, wherein said blending extruder is Banbury Kneader, Twin screw extruder or Co-kneader.

10. A method according to claim 4, wherein said crystalline polypropylene is isotactic polypropylene or an ethylene-propylene random copolymer.

* * * * *